United States Patent
Green (10) Patent No.: US 6,240,193 B1
(45) Date of Patent: May 29, 2001

(54) TWO LINE VARIABLE WORD LENGTH SERIAL INTERFACE

(75) Inventor: Robert Sherman Green, Sandy, UT (US)

(73) Assignee: Sonic Innovations, Inc., Salt Lake City, UT (US)

( * ) Notice: Subject to any disclaimer, the term of this patent is extended or adjusted under 35 U.S.C. 154(b) by 0 days.

(21) Appl. No.: 09/156,546

(22) Filed: Sep. 17, 1998

(51) Int. Cl.[7] .................................................. H04R 25/00
(52) U.S. Cl. ......................... 381/314; 381/312; 710/129
(58) Field of Search ............................... 381/312, 314, 381/315, 323; 710/129, 130, 69

(56) References Cited

U.S. PATENT DOCUMENTS

| | | | |
|---|---|---|---|
| Re. 34,961 | 6/1995 | Widin et al. ............... | 364/578 |
| 3,718,763 | 2/1973 | Cannon et al. ............ | 179/1 N |
| 3,793,485 | 2/1974 | Feezor et al. ............. | 179/1 N |
| 3,848,091 | 11/1974 | Stearns et al. ............ | 179/1 N |
| 3,989,904 | 11/1976 | Rohrer et al. ............. | 179/107 FD |
| 4,109,106 | 8/1978 | Voss ......................... | 179/1 N |
| 4,157,456 | 6/1979 | Voss ......................... | 179/1 N |
| 4,222,393 | 9/1980 | Hocks et al. .............. | 128/746 |
| 4,321,427 | 3/1982 | Singh ........................ | 179/1 N |
| 4,489,610 | 12/1984 | Slavin ....................... | 73/585 |
| 4,548,082 | 10/1985 | Engebretson et al. .... | 73/585 |
| 4,603,324 | 7/1986 | Hu ............................ | 340/384 E |
| 4,622,440 | 11/1986 | Slavin ....................... | 381/68.1 |
| 4,674,123 | 6/1987 | Michas ...................... | 381/60 |
| 4,759,070 | 7/1988 | Voroba et al. ............. | 381/60 |
| 4,764,957 | 8/1988 | Angelini et al. ........... | 379/433 |
| 4,768,165 | 8/1988 | Hohn ........................ | 364/900 |
| 4,879,749 | 11/1989 | Levitt et al. ............... | 381/68.4 |
| 4,901,353 | 2/1990 | Widin ....................... | 381/68 |
| 4,947,432 | 8/1990 | T pholm ................... | 381/68.2 |
| 4,947,433 | 8/1990 | Gebert ...................... | 381/68 |
| 4,953,112 | 8/1990 | Widin et al. ............... | 364/578 |
| 4,972,487 | 11/1990 | Mangold et al. .......... | 381/68 |
| 4,989,251 | * 1/1991 | Mangold .................. | 381/68.2 |
| 4,992,966 | 2/1991 | Widin et al. ............... | 364/571.04 |
| 5,012,520 | * 4/1991 | Steeger ..................... | 381/68 |
| 5,083,312 | 1/1992 | Newton et al. ............ | 381/68.4 |
| 5,144,674 | 9/1992 | Meyer et al. .............. | 381/68 |
| 5,202,927 | 4/1993 | T pholm ................... | 381/68 |
| 5,210,803 | 5/1993 | Martin et al. .............. | 381/68 |

(List continued on next page.)

FOREIGN PATENT DOCUMENTS

| | | | |
|---|---|---|---|
| 0 341 903 | 5/1989 | (EP) | H04R/25/00 |
| 0 714 067 | 9/1995 | (EP) | G06F/13/38 |
| 0 823 829 | 8/1997 | (EP) | H04R/25/00 |

OTHER PUBLICATIONS

Krena, et al., An Oversampled Sigma–Delta AD Converter Circuit Using Two–Stage Fourth Order Modulator:, 1990, IEEE, pp. 3279–3282.

Norsworthy et al., "Delta–Sigma Data Converters–Theory, Design, and Simulation", IEEE Circuits & Systems Society, pp. 321–324.

Zhang, Bo, "Delta–Sigma Overview", Fall 1996, ECE 627, pp. 1–29.

*Primary Examiner*—Huyen Le
*Assistant Examiner*—P Dabney
(74) *Attorney, Agent, or Firm*—Thelen Reid & Priest LLP; David B. Ritchie (57) ABSTRACT

In a serial interface for a programmable hearing aid, no address is provided for the data transferred to or read from the hearing aid, rather, for each instruction, the number of data words being transferred pursuant to each instruction and the beginning word are known in the controlled device. In the serial interface, the data is clocked into and out of the hearing aid on a serial data pin by a serial clock. Because no addresses are sent along with the data to the controlled device, the amount of data transferred to the hearing aid is significantly reduced, and no circuitry is required to save the address.

6 Claims, 3 Drawing Sheets

U.S. PATENT DOCUMENTS

| | | | |
|---|---|---|---|
| 5,226,086 | * 7/1993 | Platt | 381/58 |
| 5,303,306 | 4/1994 | Brillhart et al. | 381/68 |
| 5,384,852 | 1/1995 | Schären | 381/68 |
| 5,475,759 | * 12/1995 | Engebretson | 381/68.2 |
| 5,495,242 | 2/1996 | Kick et al. | 340/902 |
| 5,500,902 | 3/1996 | Stockham, Jr. et al. | 381/68.4 |
| 5,515,443 | 5/1996 | Meyer | 381/69 |
| 5,710,819 | * 1/1998 | Topholm et al. | 381/68.2 |
| 5,748,684 | 5/1998 | Sanchez | 375/357 |
| 5,838,801 | * 11/1998 | Ishige et al. | 381/68.4 |
| 6,023,517 | * 2/2000 | Ishige | 381/315 |
| 6,058,197 | * 5/2000 | Delage | 381/314 |

\* cited by examiner

| Code | Command | Binary Coded Number | # of Data Clocks |
|---|---|---|---|
| 100000x | Norm Mode | 0 | none |
| 100001x | Write Trim Register | 1 | 32 |
| 100010x | Write Tone Volume Control | 2 | 9 |
| 100011x | Write EEPROM odd rows | 3 | 64 |
| 100100x | Write EEPROM even rows | 4 | 64 |
| 100101x | Write EEPROM Block mode | 5 | 5 |
| 100110x | Write Channel select register | 6 | 9 |
| 100111x | Write Control Register | 7 | 18 |
| 101000x | Write ATD register (DSPin) | 8 | 14 |
| 101001x | Write Register File | 9 | 64 x 20 |
| 101010x | Write DSP register (DSPout DTAin) | 10 | 12 |
| 101011x | Write EEPROM | 11 | 9 rows x 64bits |
| 101100x | Read ATD Register (DSPin) | 12 | 16 |
| 101101x | Read Register File | 13 | 64 x 20 |
| 101110x | Read DSP register (Dspout DTAin) | 14 | 16 |
| 101111x | Read EEPROM | 15 | 9 x 4 x 20 |
|  | not decoded 16-27 |  |  |
|  |  |  |  |
| 111100x | Write ATD external Gain | 28 | 6 |
| 111101x | Spare | 29 |  |
| 111110x | Spare | 30 |  |
| 111111x | Spare | 31 |  |

TABLE I

*FIG. 3*

Tone Generation Table

| Tone Frequency (Hz) | 500 | 755 | 1000 | 1500 | 2000 | 3000 | 4000 | 6000 | 8000 |
|---|---|---|---|---|---|---|---|---|---|
| Number of Cycles | 1 | 2 | 2 | 3 | 4 | 6 | 8 | 12 | 16 |
| Number of Samples | 40 | 53 | 40 | 40 | 40 | 40 | 40 | 40 | 40 |

TABLE II

*FIG. 4*

TWO LINE VARIABLE WORD LENGTH SERIAL INTERFACE

BACKGROUND OF THE INVENTION

1. Field of the Invention

The present invention relates to a serial interface for a microcontroller or microprocessor. More particularly, the present invention relates to a two line serial interface between a microprocessor or microcontroller and a peripheral device, such as a hearing aid, that does not require that an address be provided to the peripheral device.

2. The Prior Art

In well-known methods of acoustically fitting a hearing compensation device such as a hearing-aid to an individual, the hearing profile of the individual's hearing is typically measured using an audiometer generating pure tones at various frequencies between 125 Hz and 12,000 Hz that are representative of the frequency bands the tones are included in. These tones are transmitted to the individual being tested to determine the amount of amplification, compression, and/or other adjustment that will be employed to compensate for the individual's loss of hearing.

When the audiometer apparatus includes earphones to supply the tones to an individual being tested, it is difficult to calibrate the output of the hearing-aid device to be worn by the individual to match the output of the headphones which were used to measure the hearing loss. Another problem associated with the use of headphones to present tones to the individual is that due to the unique acoustics of each individual's ear canal, the acoustic response and therefore the perception by the individual of the sound provided by the headphones will be different from the perception of sound when the actual hearing-aid device is inserted into the ear canal.

Finally, once the hearing compensation provided by the hearing-aid has been set, and the hearing-aid has been inserted into the ear canal of the individual, the testing methods do not provide any satisfactory manner of performing an instantaneous comparison between a first fitting and a second fitting. This is known as A-B comparison. Typically, the amount of time required to perform an A-B comparison is either the amount of time needed to remove a device A and insert a second device B, or the 20 plus seconds required to update the programmed hearing compensation in a programmable hearing aid. This makes it difficult for an individual to accurately compare perceived differences in loudness in response to stimuli for the alternate fittings.

To overcome the problems associated with an audiometer apparatus that either employs headphones or a generic device that is fits into the ear to test for hearing loss, Sonic Innovations, Inc. has developed a fitting system that employs a programmable hearing aid to be worn by the individual as the means of generating the tones used to assess the hearing loss. In addition to being programmable to set the parameters for the signal processing circuits in the hearing that provide hearing compensation, the hearing aid may also be various circuit component in the hearing aid may be trimmed to compensate for variation in the electrical characteristics of the components employed in a hearing aid.

Since the data to generate the tones, program the hearing compensation and trim the components of the hearing aid must be written into the actual hearing aid that the user will wear, the interface between the device providing the data and the hearing aid should have a minimum number of pins and be very efficient due to size and data transmission time constraints. There are several known serial interfaces that are employed in microcontrollers, including the $I^2C$ from Phillips Electronics Eindhoven, Netherlands, SPI from Motorola, Schaumberg, Ill., and micro-wire, from National Semiconductor, Santa Clara, Calif. Typically these serial interfaces require that the data sent over the serial interface includes an address for the data and further, that the data have a fixed word length. This presents a disadvantage in systems where data transmission time and size constraints are important, because more data is sent than is needed, and additional circuits are required to process the unnecessary data.

BRIEF DESCRIPTION OF THE INVENTION

In a serial interface for a programmable hearing aid according to the present invention, no address is provided for the data transferred to or read from the hearing aid, rather, for each instruction, the number of data words being transferred pursuant to each instruction and the beginning word are known in the controlled device. In the serial interface, the data is clocked into and out of the hearing aid on a serial data pin by a serial clock. Because no addresses are sent along with the data to the controlled device, the amount of data transferred to the hearing aid is significantly reduced, and no circuitry is required to save the address. The write commands in the serial interface include: Write Temporary Trim Register; Write Tone Volume Control Register; Write EEPROM Odd Rows; Write EEPROM Even Rows; Write EEPROM Block Mode; Write Channel Select Register; Write Control Register; Write ADC Register; Write Register File; Write DSP Register; Write EEPROM; Write ADC External Gain. The read commands in the serial interface include: Read ADC Register; Read Register File; Read DSP Register; and Read EEPROM.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

A serial interface according to the present invention employs four pins, including, Serial Clock (SCLK), Serial Data (SDA), power (Vdd) and ground. In the serial interface, no address is provided for the data transferred to the controlled device, e.g. a hearing aid, rather, for each instruction, the number of data words being transferred and the beginning word are known in the controlled device. Because no addresses are sent along with the data to the controlled device, the amount of data transferred to the hearing aid is significantly reduced, and no circuitry is required to save the address. In a preferred embodiment, an external device for communicating with the serially with a hearing aid according to the present invention is a Madson's electronic HI-PRO device, manufactured by Madson's Electronics. Although the HI-PRO device is used in the presently preferred embodiment of the invention it should be appreciated by those of ordinary skill in the art that other external sources could be used to communicate with the hearing aid.

Figure 1:
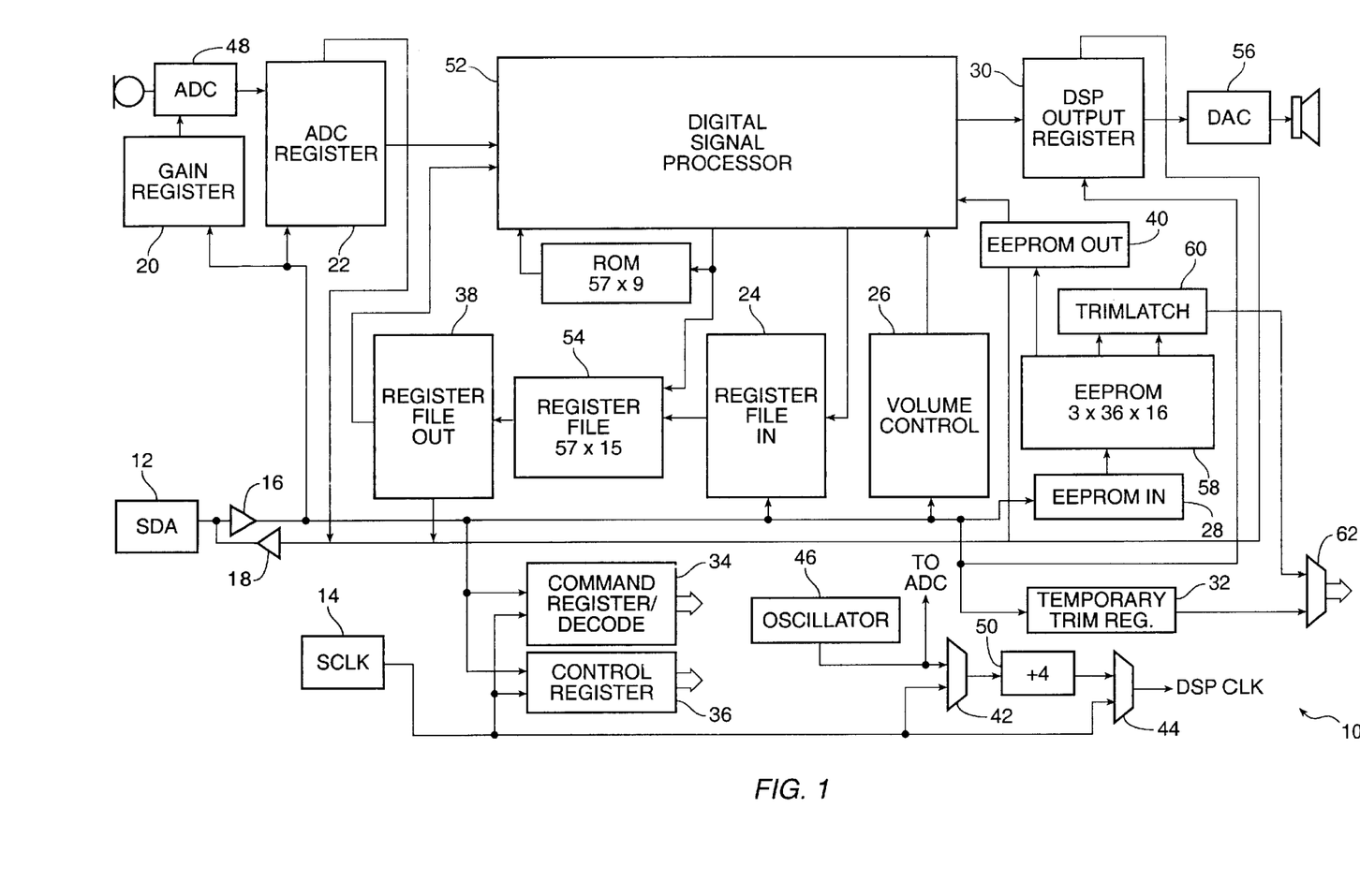
FIG. 1 illustrates a block diagram of the serial interface circuit disposed in a hearing aid according to the present invention.

Turning now to FIG. 1, a block diagram of a portion of a hearing aid 10 including the serial interface according to the present invention is depicted. In the serial interface circuit, the SDA pin 12 and SCLK pin 14 are depicted while the pins for power and ground are omitted to avoid obscuring the present invention. The SDA pin 12 is connected to the input of an input buffer 16, and to the output of an output buffer 18. The input buffer 16 is connected to a gain register 20, an analog-to-digital converter (ADC) register 22, a register file input buffer register 24, a volume control register 26, an EEPROM input buffer register 28, a digital signal processor (DSP) output register 30, a temporary trim register 32, a command register 34, and a control register 36. The control register 32 includes a latch (not shown). The output buffer 18 is connected to the ADC register 22, a register file output buffer register 38, an EEPROM output buffer register 40, and the DSP output register 30.

The SCLK pin 14 is connected to the command register 34, the control register 36, a first two-input multiplexer 42, and a second two-input multiplexer 44. An internal oscillator 46 is connected to a second input of first multiplexer 42 and also provides a clock to an ADC 48. During normal operation of the hearing aid, the input of the ADC 48 is connected to the electrical input to the hearing aid. The output of ADC 48 is connected to the ADC register 22. The output of first multiplexer 42 is connected to the input of divide-by-four circuit 50. The output of the divide-by-four circuit 50 is connected to the second input of second multiplexer 44. The output of second multiplexer 44 provides a clock to DSP 52.

The output of the register file input buffer register 24 is connected to a register file 54, and the output of the register file 54 is connected to the input of register file output buffer register 38. The output of the DSP output register 30 is connected to digital-to-analog converter (DAC) 56. The output of the EEPROM input register 28 is connected to an EEPROM 58, and the output of the EEPROM 58 is connected to the input of EEPROM output register 40 and a trim latch 60. The output of the trim latch 60 is connected to two input multiplexer 62, and the second input of a third multiplexer 62 is connected to the output of the temporary trim register 32. The output of the third multiplexer 62 provides trim signals to various circuits in the hearing aid 10.

In the serial interface, the SDA pin 12 is employed to input a serial data stream including various read and write instructions to be described below from the Hi-pro or external device to the hearing aid 10 and to output data from the hearing aid 10 during both testing and in the fitting process to determine whether the data in the hearing aid 10 is as expected. The SCLK pin 14 is used to input a serial clock that clocks in the instructions from the serial data input stream on the SDA pin 12.

The present maximum clock rate from the HI-PRO device to the serial interface circuit is 7 KHZ. It is anticipated however that the serial interface circuit will also interface to other devices such as IC testers, and as a result the SDA and SCLK signals can operate at 1.5 MHZ when receiving data from an external source. The serial interface circuit can drive output through the SDA pin 12 having a 50 pf load at a 500 kHz clock rate.

Figure 2:
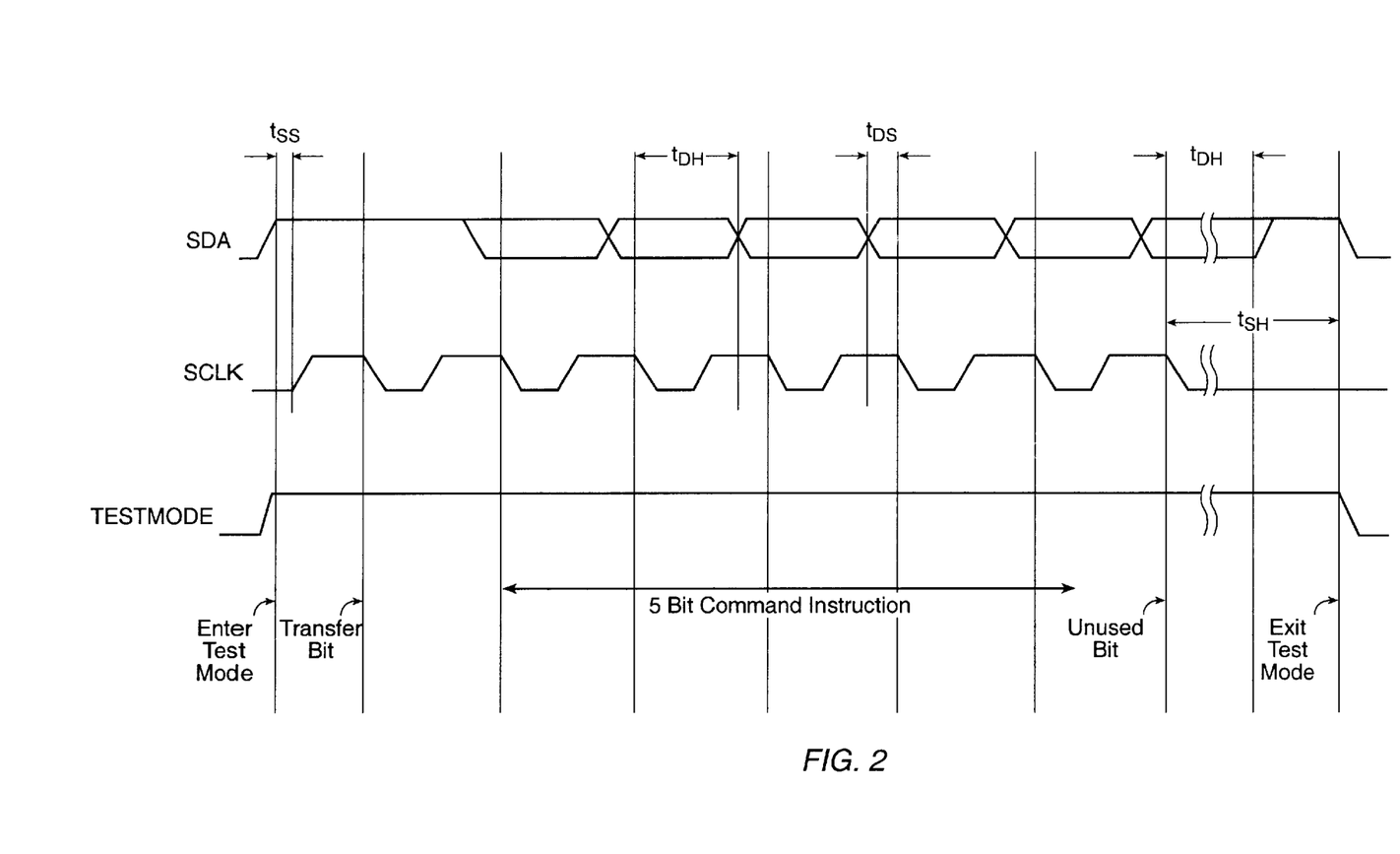
FIG. 2 illustrates an exemplary timing diagram for instructions received through the serial interface circuit according to the present invention.

In FIG. 2, an exemplary timing diagram for the instructions received through the serial interface is illustrated. When the hearing aid is in its typical mode of operation both the SDA pin 12 and the SCLK pin 14 are both held low. When an instruction is input to the hearing aid, a state known as TEST mode, the SDA pin 12 is brought HIGH while the SCLK pin 14 is held LOW. The data stream of the instruction is then input through the SDA pin 12 by toggling the SCLK signal to the SCLK pin 14. According to the preferred embodiment, to remain in TEST mode, the data being input on the SDA pin 12 is permitted to only make a transition when the SCLK 104 input is in a HIGH state. This is illustrated in FIG. 2 as $t_{DH}$, the data hold time. The setup time for the SDA signal transition, shown as $t_{DS}$, is preferably 200 ns prior to the transition from HIGH to LOW of the SCLK signal.

Each of the instruction commands is seven bits in length, wherein the leading bit is always a HIGH logic state and the last bit is a don't care (X). Once all of the instruction bits have been toggled in by the SCLK signal, the instruction command is decoded by command register decode 34. The instruction set includes both read and write commands.

When the instruction is a write command, the write command will be decoded, and the number of bits to be written as determined by the particular write command will be shifted in onto the SDA pin 12 as the SCLK signal is toggled. The termination of a write command is made by the Hi-Pro or external source. After all the bits associated with the command have been toggled into the hearing aid 10, the SDA pin 12 will be pulled low by the Hi-Pro or external source after the SCLK signal has been low for at least 200 ns. The write commands include: Write Temporary Trim Register; Write Tone Volume Control Register; Write EEPROM Odd Rows; Write EEPROM Even Rows; Write EEPROM Block Mode; Write Channel Select Register; Write Control Register; Write ADC Register; Write Register File; Write DSP Register; Write EEPROM; Write ADC External Gain.

When the instruction is a read command, the SDA pin 12 will be tri-stated by the external source after the seventh bit of the instruction is toggled in so that the hearing aid can drive the read data on the SDA pin 12 on the rising edge of the SCLK signal. The hearing aid will count the number of rising edge transitions of the SCLK signal, and will terminate the data read when appropriate. The read commands include: Read ADC Register; Read Register File; Read DSP Register; and Read EEPROM.

Figure 3:
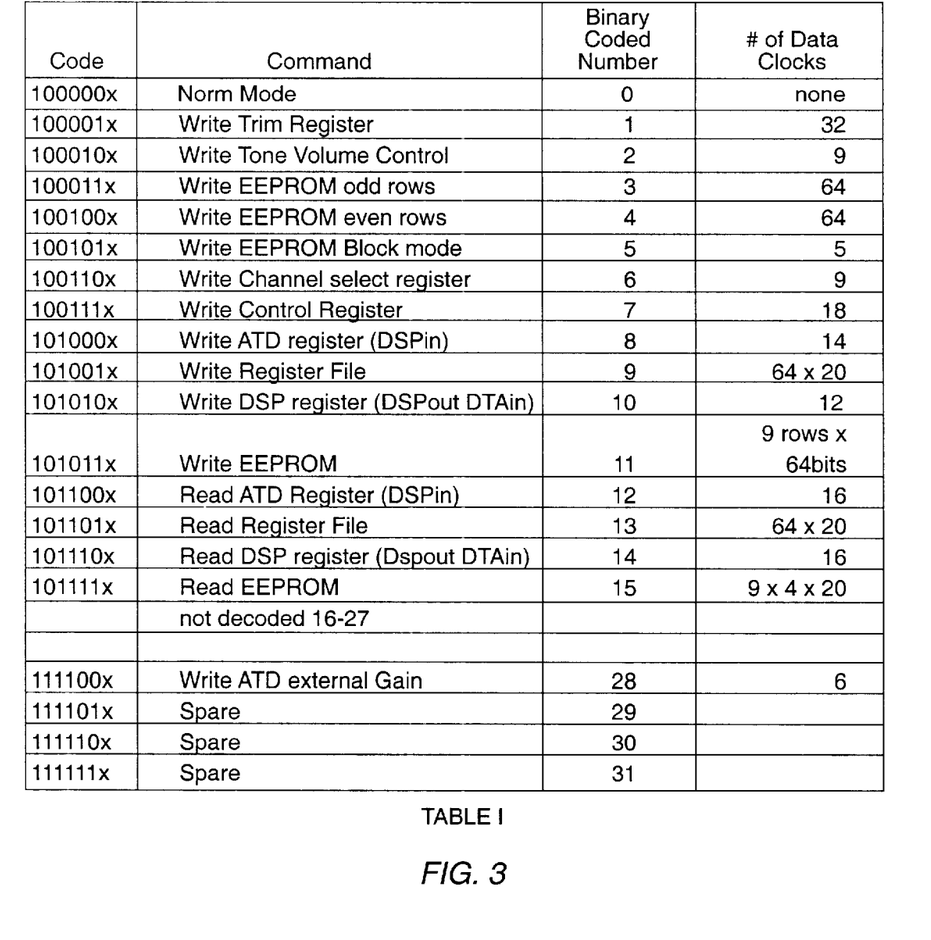
FIG. 3 illustrates in Table I the op-codes for each of the commands of the serial interface according to the present invention.

In Table I of FIG. 3, the op-codes for each of the commands of the serial interface are illustrated. The number of SCLK cycles associated with each instruction is also listed. In the following, a description of each of the commands is given.

In the Normal Mode, the Command Register 34 is at 0000000. As the hearing aid is powered up, the Command Register 34 is reset to 0000000, and the SDA pin 12 and SCLK pin 14 are pulled low. The Command Register 34 is reset to 0000000 whenever a read command is completed or when the SDA pin 12 is pulled low with the SCLK signal low.

The Write Temporary Trim Register command is employed to write temporary trim bits to the 32-bit serial in and parallel out temporary trim register 32 to quickly change the trim values of the hearing aid without writing to the EEPROM 58. The trim bits include, ADC offset, voltage regulator trim, oscillator trim, switch type (pushbutton or toggle), dead zone, DAC trim, tele-coil switch enable, integer or delta number representation is the DSP, receiver driver or pulse coded modulator select, and low voltage pump enable. As will be appreciated by those of ordinary skill in the art, the trim bits are employed to adjust various circuit parameters of the hearing aid to desired value. With the Write Temporary Trim Register command, the trim bits can be changed quickly until the correct trim value is found. Once the correct trim value is found, the value can be written to the appropriate control bits in the EEPROM 58. As will be explained below, when Control bit 13 in the Control Register 36 is set to '1', the temporary trim bits will be employed by the hearing aid, and when the value is set to '0', the control bits in the EEPROM 58 will be employed.

The Write Tone Volume Control Register command is employed to adjust the value in the volume control register 26. During the fitting process, when the DSP 52 is employed to generate tones, the value in the volume control register 26 controls the dynamic level of the tone being generated by the hearing aid. A value of all 1's in the volume control register 26 represents maximum volume. Power On Reset will reset the value in the volume control register 26 to zero.

The EEPROM Mass Odd Row Write, Mass Even Row Write and Block Mode Write commands are specialized operations for writing to the EEPROM 58. In the EEPROM Mass Odd Row Write, the EEPROM input register 28 is written with 64 bits of data (the last bit of the command is the first of the 64 bits). An additional 67 clock cycles of the SCLK signal are then observed so that the 64 bits of data in the EEPROM input register 28 can be written into each of the odd rows of the EEPROM 58. In the EEPROM Mass Even Row Write, the EEPROM Input Register 28 is written with 64 bits of data (the last bit of the command is the first of the 64 bits). An additional 67 clock cycles of the SCLK signal are then observed so that the 64 bits of data in the EEPROM Input Register 28 can be written into each of the even rows of the EEPROM 50. In the EEPROM Block Mode Write, a single data bit follows the command. This single data bit is written into all of the memory cells of the EEPROM 58. An additional 67 clock cycles of the SCLK signal are then observed so that data can be written into the EEPROM 58. It should be appreciated by those of ordinary skill in the art that the 67 clock cycles are employed to time out the approximately 10 milliseconds required to perform an EEPROM write operation.

The Write Channel Select Register command is employed during the fitting process to select particular frequency bands for summation at the output of the hearing aid. In the preferred embodiment of a hearing aid according to the present invention, the hearing compensation is performed on nine separate frequency bands. Accordingly, following the Write Channel Select Register command, a nine bit control word is sent to the DSP 52 where it is used to select the desired channels.

The Write Control Register command is employed to write data into an 18 bit Control Register 36. The eighteen bits of the Control Register 36 direct various functions of the hearing aid, including some of the circuits employed in the fitting process.

Bit 0 is used to control the DAC clock. When bit 0 is a '1', the DAC clock will receive a clock during serial mode. When bit 0 is a '0', the DAC clock will stop during serial mode.

Bit 1 is used to control the clock resource. When bit 1 is a '0' an internal oscillator will be used as the clock source in the hearing aid, and when bit 1 is a '1', the SCLK will be used as the clock source. It should be appreciated that the internal clock source may be a much faster clock source than the SCLK, and would therefore be preferably employed when writing or reading to or from the EEPROM 58 or Register File 54.

Bits 2 and 3 determines which portion of the EEPROM 58, as will be described below, is addressed during test modes. The Power On Reset condition of bits 2 and 3 is '0'.

Bit 4 can be set to '1' so that the DSP 52 will perform only one cycle and then halt. Accordingly, one data point computation will be performed by the DSP 52, and only one A to D conversion will be made by the ADC 48. When bit 1 is '1', (SCLK source), an additional 256 clock cycles will be required to complete the DSP cycle (additional clock cycles will be disregarded, and when bit 1 is a '0' the cycle will be completed by the internal clock. Otherwise, when bit 4 is a '0', and the DSP 52 is enabled, the DSP 52 will operate in a normal mode.

Bit 5 is used to reset the DSP 52. When bit 5 is '0' and the DSP 52 is enabled, the hearing aid will be in a normal mode. When bit 5 is a '1', the DSP 52, the ADC and other logic in the hearing aid will be reset and no hearing aid algorithms will be executed.

Bit 6 is used in tone generation. This bit is only valid when bit 7 is a '1'. When bit 6 is "1", the DSP 52 will read the first fifty-three words to generate tones, and when bit 6 is "0", the DSP 52 will read the first forty words to generate tones.

Bit 7 indicates whether the hearing aid will operate under normally or whether tones will be generated from the data in the register file 54. If bit 7 is "0" then the DSP 52 will execute the hearing aid algorithm, and when bit 7 is a "1", then the DSP 52 will generate a tone from the data in the register file 54.

Bit 8 is a random noise select for either a programmed amplification of the microphone input or a pseudo random noise source inside the hearing aid. When bit 8 is set to a "1", the random noise source is selected, and when bit 8 is set to a "0" the microphone is selected as a source.

Bit 9 selects whether the DSP 48 or the volume control register 26 will set the volume of the output audio signal. When bit 9 is a "1" the volume control register 26 will set the volume, and when bit 9 is a "0" the volume will be set by the DSP 52.

Bit 10 is a disable for the A/D output. When the 10 is a "1" the data from the ADC 48 will not be loaded into the ADC register 22. Rather, data shifted in from SDA pin 12 will be used as input to the DSP 52. At Power On Reset, bit 10 is set to '0'.

Bit 11 disables the DSP output. When bit 11 is a "1", data from the DSP 52 is not loaded into the DSP output register 30. This allows the DAC 56 to be tested by data sent through SDA pin 12. When bit 13 is '0' and data is written to the DSP 52, the DSP output register 30 will be overwritten by the DSP 52. At Power On Reset, bit 11 is set to '0'.

Bit 12 enables the DSP 52 operation. When bit 12 is '0' the DSP 52 will continue operating using the internal clock even though the SDA pin 12 is operating. When control bit 12 is a '1', however, the DSP 52 will cease operation whenever the hearing aid is in TEST mode.

Bit 13 is a trim bit selection. When control bit 13 is a '1', the trim bits are supplied by the Temporary Trim Bit Register 32. When control bit 13 is a '0', the trim bits are supplied by the EEPROM 58.

Bit 14 is an enable for the SYNC drive. When bit 14 is a '1', the SYNC pin output is driven with either the channel '1' signal or the compare bit, and when bit 14 is a '0', the SYNC output is held low.

Bit 15 is a SYNC selection bit. The hearing aid has an extra pad that is available at wafer sort and characterization called SYNC. This signal can be used to synchronize external operations, such as a tester, with the internal operations of the hearing aid. Whenever bit 15 is '0', the SYNC drive will be driven from the channel counter (channel "1" timing signal). When bit 15 is a "1", the SYNC dry will be driven from the CMP of the ADC 48. If bit 14 is a "0", the output is held at ground.

Bit 16 controls the external ADC gain register 20. When control bit 16 is a '0', the ADC 48 gain is set by circuitry associated with the DSP 52. When control bit 16 is a "1", the ADC 48 gain is set by the gain register 20.

Bit 17 is a transfer flag. Bit 17 is the first bit of the control word. When bit 17 at the last location in the Control Register 36, the trailing seventeen bits in the control word are latched and remain valid until rewritten at a later time.

The Write A to D Register command is employed to provide data to the DSP 52 when testing the DSP 52. The data will change on the positive edge and the hearing aid will read the data on the negative edge. When the control bit 9 is set, the ADC 48 is prevented from loading the ADC register 22. Otherwise, the ADC 48 will continue to write data to the ADC register 22, so that data being provided serially may be overwritten before it is used by the DSP 52.

The Write Register File command is employed to write serial data corresponding to a tone at a desired frequency into Register File 54. In the preferred embodiment of the present invention, register file 54 is fifty-seven words in length, and each word is fifteen bits wide. Although the register file 54 has only fifty-seven words, the HI-PRO device used in the preferred embodiment will write for 64 cycles to the register file 54. Despite the fact that the HI-PRO will send clocking and data as though all sixty-four words are present in the register file 54, some address locations are not written. In writing data to register file 54, a 16-bit word of data from the serial data input stream is first written into the register file input register 24 and then clocked in the register file 54 with the next four SCLK cycles. This 16-bit word includes 15 bits for the Register File 54 and one spare bit.

Accordingly, for the Write Register File command, a total of twenty SCLK cycles are required for each data word written into the register file 54. The data in the serial data stream is written into sequential memory locations in the register file 54, with the first word of data being written into the first memory location of register file 54. The address in the Register File 54 is kept track of by channel and cycle counters (not shown).

Figure 4:
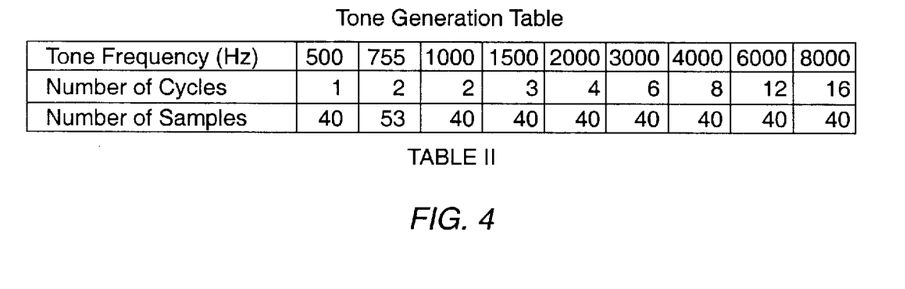
FIG. 4 is table illustrates in Table II the center frequencies of each of the frequency bands and the number of data words required to generate each center frequency according to the present invention.

Though the register file 54 is used during ordinary operation of the DSP 52, the state machine that controls the DSP 52 will read the register file 54 during TEST mode at a rate of 1 word per 50 µs to generate the desired tones. The tone being generated in each of the frequency bands and the number of words used to implement each tone is illustrated in Table II of FIG. 4. It should be appreciated that after the number of words, according to Table II, needed to generate the desired tone have been read, the state machine in the DSP 52 will loop back to the beginning of the Register File 54, until instructed to halt. Once the halt occurs, a delay of at least 256 clock cycles must be observed to ensure that the DSP 52 has halted the channel and cycle counters at the beginning address.

The Write DSP Register command is employed write data to the DSP output register 30 to test the DAC 56. The data will change on the positive edge and the hearing aid will read the data on the negative clock edge.

The Write EEPROM command is employed to write to the EEPROM 58, the data needed to configure the DSP 52 with the parameters to provide the desired hearing compensation in the hearing aid. In the preferred embodiment of the present invention, the EEPROM 58 is partitioned into three groups of thirty-six words, each word having 16-bits. It should be further appreciated that according to the preferred embodiment any of the three groups of thirty-six words may be selected for programming The selection of the group of thirty-six words for programming is determined by the status of bits 2 and 3 in the control register 36.

In the Write EEPROM operation, following the command, 64-bits of data are shifted into the EEPROM Input Register 28. To write the data into the EEPROM 58, there will then be 67 clock cycles observed as described above. The process of writing into the EEPROM Input Register 28 followed by 67 clock cycles is repeated until the group of 36 words has been written. The process can be halted to write less than a full group after any set of 67 clock cycles employed to program the data from the EEPROM Input Register 28 into the EEPROM 58.

It is contemplated that one of the three groups of thirty-six words of the EEPROM 58 will be written with identifying information of the hearing aid, including, the user, the dispenser, the production lot, the fabrication lot, etc., that can be read during the fitting process or can be used for tracking when the device is returned from the field. Further, the EEPROM 58 can store the gain characteristics of the microphone and receiver of the hearing aid for each of the different frequency bands. The amplification data on microphone and receiver will be written into the EEPROM 58 by the final test program, only to be read by the fitting program. During the fitting system the gain constants could automatically be adjusted to compensate for any slight variation in these devices.

The Write A to D Gain Register command is employed to write a 6-bit word to the Gain Register 20 to control the gain of the ADC 48 when the control bit 16 is '1'.

The Read ADC Register command is employed to read the contents of the ADC Register 22. Following the Read ADC Register command, the hearing aid will begin sending the contents of the ADC Register 22 to an external source on the eighth SCLK cycle on the SDA pin 12 that has been tri-stated. Data will change on the negative edge of the clock and will read by the external device on the following positive edge. Once the 16-bits form the ADC Register 22 are sent, the hearing aid drive on the SDA pin 12 will be terminated and the hearing aid will return to a normal mode. During the Read ADC Register command, the contents of the ADC Register 22 are destroyed.

The Read Register File command is employed to read the contents of the Register File 54. Following the Read Register File command, the first row in the Register File 54 will be transferred to the Register File Output Register 38 in four SCLK cycles. The contents of Register File Output Register 38 will then be shifted out of the hearing aid during the next sixteen SCLK cycles on the SDA pin 12 that has been tri-stated. These groups of twenty SCLK cycles will continue until the contents of the Register File 54 have been read. The data shifted out of the hearing aid will change on the negative edge of the clock and will read by the external device on the following positive edge.

The Read DSP Register command is employed to read the contents of the DSP Output Register 30. Following the Read DSP Register command, the hearing aid will begin sending the contents of the DSP Output Register 30 to an external source on the eighth SCLK cycle on the SDA pin 12 that has been tri-stated. Data will change on the negative edge of the clock and will read by the external device on the following positive edge. Once the 16-bits form the DSP Output Register 30 are sent, the hearing aid drive on the SDA pin 12 will be terminated and the hearing aid will return to a normal mode. During the Read DSP Register command, the contents of the DSP Output Register 30 are destroyed.

The Read EEPROM command is employed to read the contents of the EEPROM 58. The group of thirty six words to be read is determined by the control bits 2 and 3. Following the Read EEPROM command, the first row in the EEPROM 58 will be transferred to the EEPROM Output Register 40 in four SCLK cycles. The contents of EEPROM Output Register 40 will then be shifted out of the hearing aid during the next sixteen SCLK cycles on the SDA pin 12 that has been tri-stated. The groups of twenty SCLK cycles will continue until the contents of the EEPROM 58 have been read. The data shifted out of the hearing aid will change on the negative edge of the clock and will read by the external device on the following positive edge. The data shifting can be suspended by not toggling the SCLK signal and then restarted by again toggling the SCLK signal. Once the correct number of SCLK cycles have occurred, the hearing aid will stop driving the SDA pin 12.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A serial interface for a programmable hearing aid comprising:
   a serial clock pin connected to a command register, a control register, a first two-input multiplexer, and a second two-input multiplexer, wherein said serial clock pin is used to input a serial clock that clocks in read and write instructions from a serial data stream;
   a serial data pin connected to an input of an input buffer and to an output of an output buffer, wherein said serial data pin is employed to input said serial data stream, said input buffer being connected to a first plurality of registers and said output buffer being connected to a second plurality of registers,
   a power pin connected to an input of an analog-to-digital converter, wherein an output of said analog-to-digital converter is connected to an analog-to-digital converter register; and
   a ground pin.

2. The serial interface of claim 1 wherein said first plurality of registers includes a gain register, an analog-to-digital converter register, a register file input buffer register, a volume control register, an EEPROM input buffer register, a digital signal processor output register, a temporary trim register, a command register, and a control register.

3. The serial interface of claim 2 wherein said second plurality of registers includes said analog-to-digital converter register, a register file output buffer register, an EEPROM output buffer register, and said digital signal processor output register.

4. The serial interface of claim 3 wherein a second input of said first two-input multiplexer is connected to an internal oscillator that also provides a clock to said analog-to-digital converter, an output of said analog-to-digital converter being connected to said analog-to-digital converter register, an output of said first multiplexer being connected to the input of a divide-by-four circuit, the output of said divide-by-four circuit being connected to a second input of said second two-input multiplexer, an output of said second two-input multiplexer providing said clock to a digital signal processor.

5. The serial interface of claim 4 wherein an output of said register file input buffer register is connected to a register file, an output of said register file being connected to an input of said register file output buffer register, an output of said digital signal processor output register being connected to said digital-to-analog converter.

6. The serial interface of claim 5 wherein an output of said EEPROM input buffer register is connected to an EEPROM, an output of said EEPROM being connected to an input of said EEPROM output register and a trim latch, said output of trim latch being connected to a first input of a third two-input multiplexer, a second input of said third two-input multiplexer being connected to an output of a temporary trim register, an output of said third two-input multiplexer providing trim signals to various circuits in the programmable hearing aid.

\* \* \* \* \*

UNITED STATES PATENT AND TRADEMARK OFFICE
CERTIFICATE OF CORRECTION

PATENT NO. : 6,240,193 B1
DATED : May 29, 2001
INVENTOR(S) : Robert Sherman Green Page 1 of 1

It is certified that error appears in the above-identified patent and that said Letters Patent is hereby corrected as shown below:

Column 2,
Line 48, delete "is table".

Column 3,
Line 5, delete "with the".
Line 49, after "to" insert -- a first input of a third --.
Line 49, replace "two" with -- two- --.

Column 6,
Line 17, replace "disregarded" with -- disregarded) --.

Signed and Sealed this

Fifteenth Day of January, 2002

Attest:

JAMES E. ROGAN
*Attesting Officer*    *Director of the United States Patent and Trademark Office*